United States Patent
He et al.

(10) Patent No.: US 11,476,908 B2
(45) Date of Patent: Oct. 18, 2022

(54) LOW-COMPLEXITY PRECODING METHOD FOR LARGE-SCALE MIMO FAST CONVERGENCE

(71) Applicant: WUHAN UNIVERSITY, Hubei (CN)

(72) Inventors: Yigang He, Hubei (CN); Tongtong Cheng, Hubei (CN); Yuan Huang, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/500,890

(22) Filed: Oct. 13, 2021

(65) Prior Publication Data
US 2022/0123802 A1  Apr. 21, 2022

(30) Foreign Application Priority Data
Oct. 16, 2020 (CN) .......................... 202011106904.4

(51) Int. Cl.
*H04B 7/0456* (2017.01)
(52) U.S. Cl.
CPC .................. *H04B 7/0478* (2013.01)
(58) Field of Classification Search
CPC .................................................... H04B 7/0478
USPC ......................................................... 375/267
See application file for complete search history.

(56) References Cited

U.S. PATENT DOCUMENTS

| | | | |
|---|---|---|---|
| 5,639,162 A * | 6/1997 | Sai | G01K 11/32 374/161 |
| 10,644,778 B2 * | 5/2020 | Shental | H04L 25/067 |
| 2002/0042698 A1 * | 4/2002 | Meuris | G06F 30/367 703/2 |
| 2021/0028836 A1 * | 1/2021 | Jeon | H04B 7/0452 |

* cited by examiner

*Primary Examiner* — Lihong Yu
(74) *Attorney, Agent, or Firm* — JCIPRNET

(57) ABSTRACT

A low-complexity precoding method for large-scale MIMO fast convergence is provided. The method includes the following steps: in step 1, starting a precoding procedure to initialize relevant parameters of an MIMO transmitting antenna; in step 2, accelerating a symmetric successive over-relaxation algorithm through a Chebyshev semi-iterative algorithm to complete a precoding inversion process according to the initialized parameters; and in step 3, generating a signal to be transmitted of the MIMO transmitting antenna according to a result of the iterative algorithm and ending the precoding procedure. Herein, the step of initializing the parameters includes parameter initialization and setting a number of transmitting antennas, a number of single-antenna users, and a channel transmission matrix. By calculating and comparing among the symbol error rates, transmission rates, and computational complexity of precoding, compared with theoretical values, the method provided by the disclosure exhibits faster convergence, lower complexity, and better performance.

4 Claims, 4 Drawing Sheets

LOW-COMPLEXITY PRECODING METHOD FOR LARGE-SCALE MIMO FAST CONVERGENCE

CROSS-REFERENCE TO RELATED APPLICATION

This application claims the priority benefit of China application serial no. 202011106904.4, filed on Oct. 16, 2020. The entirety of the above-mentioned patent application is hereby incorporated by reference herein and made a part of this specification.

BACKGROUND

Technical Field

The disclosure relates to the field of wireless communication precoding, and in particular, to a low-complexity precoding method for large-scale MIMO fast convergence.

Description of Related Art

In a conventional MIMO system, the precoding technology is used to solve the problem of communication interference between users. According to different models, the existing precoding technology may be divided into linear precoding and non-linear precoding. Although non-precoding features a favorable effect on suppressing user interference, the computational complexity of non-precoding is considerably high. The linear precoding has lower computational complexity, but its performance is not as good as that of the non-linear precoding. The commonly used linear precoding includes matching precoding, zero-forcing precoding, and regularized zero-forcing precoding and the like. Among them, the zero-forcing precoding technique has been widely applied due to its good performance. Further, a large-scale MIMO antenna system, as affected by "channel hardening", the performance of linear precoding is not inferior to that of non-linear precoding. However, the large number of deployed antennas makes the complexity of inversion computation of zero-forcing precoding rise sharply. In order to reduce the computational complexity of the zero-forcing precoding in a large-scale MIMO antenna system and make the computation of zero-forcing precoding faster in practical applications, the disclosure thereby provides a low-complexity precoding method for fast convergence.

SUMMARY

The disclosure provides a low-complexity precoding method for large-scale MIMO fast convergence capable of addressing the technical problem arises from the defect of excessively-high inversion complexity in zero-forcing precoding in the related art.

The technical solutions adopted by the disclosure includes the following.

The disclosure provides a low-complexity precoding method for large-scale MIMO fast convergence, and the method includes the following steps.

In step 1, a precoding procedure is started to initialize relevant parameters of an MIMO transmitting antenna.

In step 2, according to the initialized parameters, a symmetric successive over-relaxation algorithm is accelerated through a Chebyshev semi-iterative algorithm to complete a precoding inversion process.

In step 3, a signal to be transmitted of the MIMO transmitting antenna is generated according to a result of the iterative algorithm, the precoding procedure is ended.

Further, step 1 provided by the disclosure specifically includes the following step.

After the precoding procedure is started, initialization of the parameters of the MIMO transmitting antenna, including setting a number of transmitting antennas N, a number of single-antenna users K, and a channel transmission matrix H, may be performed.

Further, step 2 provided by the disclosure specifically includes the following step.

After the initialized parameters are set, a conventional zero-forcing precoding matrix is obtained through a channel matrix. Since the zero-forcing precoding matrix contains a matrix inversion computation, a symmetric successive over-relaxation iterative method is used to approximate the matrix inverse computation, and the Chebyshev semi-iterative algorithm is used to accelerate the symmetric successive over-relaxation iterative method.

Further, step 2 provided by the disclosure includes the following steps.

In step 2.1, the conventional zero-forcing precoding matrix $W_{ZF}=H^H(HH^H)^{-1}$ is obtained, and the signal to be transmitted is:

$$x=\beta_{ZF}H^H t$$

where $t=P^{-1}s$ and $P=HH^H$, $\beta_{ZF}$ is normalized transmission power, H is the channel transmission matrix, and the inversion process of the matrix is completed through symmetric successive over-relaxation.

In step 2.2, a matrix P is decomposed, $P=D+L+U$, and D, L, and U respectively represent a diagonal element, a strictly lower triangular element, and a strictly upper triangular element.

In step 2.3, t is solved through the symmetric successive over-relaxation iterative algorithm:

$$t^{(i+1)} = J_\omega t^{(i)} + H_\omega^{-1} b$$

$$J_\omega = \omega(D-\omega U)^{-1}((2-\omega)D(D-\omega L)^{-1}-I)P$$

$$H_\omega = \omega(D-\omega U)^{-1}((2-\omega)D(D-\omega L)^{-1}-I)$$

$$\omega = \frac{2}{1+\sqrt{2(2-(1+\sqrt{K/N})^2)}}$$

where N is the number of transmitting antennas, K is the number of single-antenna users, I is an identity matrix, and w is an optimal relaxation parameter.

In step 2.4, the symmetric successive over-relaxation algorithm is accelerated through the Chebyshev semi-iterative algorithm:

$$\rho^{(i+1)} = \left(1-\frac{\rho^{(i)}}{2\xi^2}\right)^{-1}$$

$$\zeta = \frac{[2-S(J_\omega)]}{S(J_\omega)}$$

$$\upsilon = \frac{2}{[2-S(J_\omega)]}$$

$$t^{(i+1)} = \rho^{(i+1)}[\upsilon(J_\omega t^{(i)} + H_\omega^{-1}s) + (1-\upsilon)t^{(i)}] + (1-\rho^{(i+1)})t^{(i-1)}$$

where ρ, ζ, and υ are Chebyshev parameters, and $S(J_\omega)$ is a spectral radius of $J_w$;

$$S(J_\omega)=\lambda_{max}^2(B)=((1+\sqrt{K/N})^2-1)^2$$

where $\lambda_{max}(B)<1$ and $B=D^{-1}(L+U)$.

It is determined whether a number of iterations is satisfied, iterations are continuously performed if the number of iterations is satisfied, and $t^{(i+1)}$ is outputted.

Further, step 3 provided by the disclosure specifically includes the following step.

An actually transmitted signal $x=\beta_{ZF}H^Ht^{(i+1)}$ of the MIMO transmitting antenna of a base station is calculated according to the iterative output result $t^{(i+1)}$ in step 2.4.

Further, the method provided by the disclosure further includes a method for analyzing and verifying the precoding method for large-scale MIMO fast convergence.

A symbol error rate analysis and a transmission rate analysis are performed. The symbol error rate analysis compares among symbol error rates of four types of precoding of ZF, SSOR, Neumann, and SI-SSOR under different number of iterations. The transmission rate analysis compares among transmission rates of the four types of precoding of ZF, SSOR, Neumann, and SI-SSOR under different number of iterations. The low-complexity precoding method for large-scale MIMO fast convergence is verified to exhibit faster convergence and lower complexity under a same performance requirement through comparison.

Effects produced by the disclosure includes the following. The low-complexity precoding method for large-scale MIMO fast convergence provided by the disclosure exhibits low complexity. Compared with the conventional zero-forcing (ZF) method, the Neumann series expansion method (Neumann), and the symmetric successive over-relaxation iterative method (SSOR), the Chebyshev semi-iterative method-accelerated symmetric successive over-relaxation algorithm (SI-SSOR) provided by the disclosure may achieve better symbol error rate performance with lower complexity.

BRIEF DESCRIPTION OF THE DRAWINGS

The disclosure is further described in detail in combination with accompanying figures and embodiments, and the following figures are provided.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure.

Figure 1:
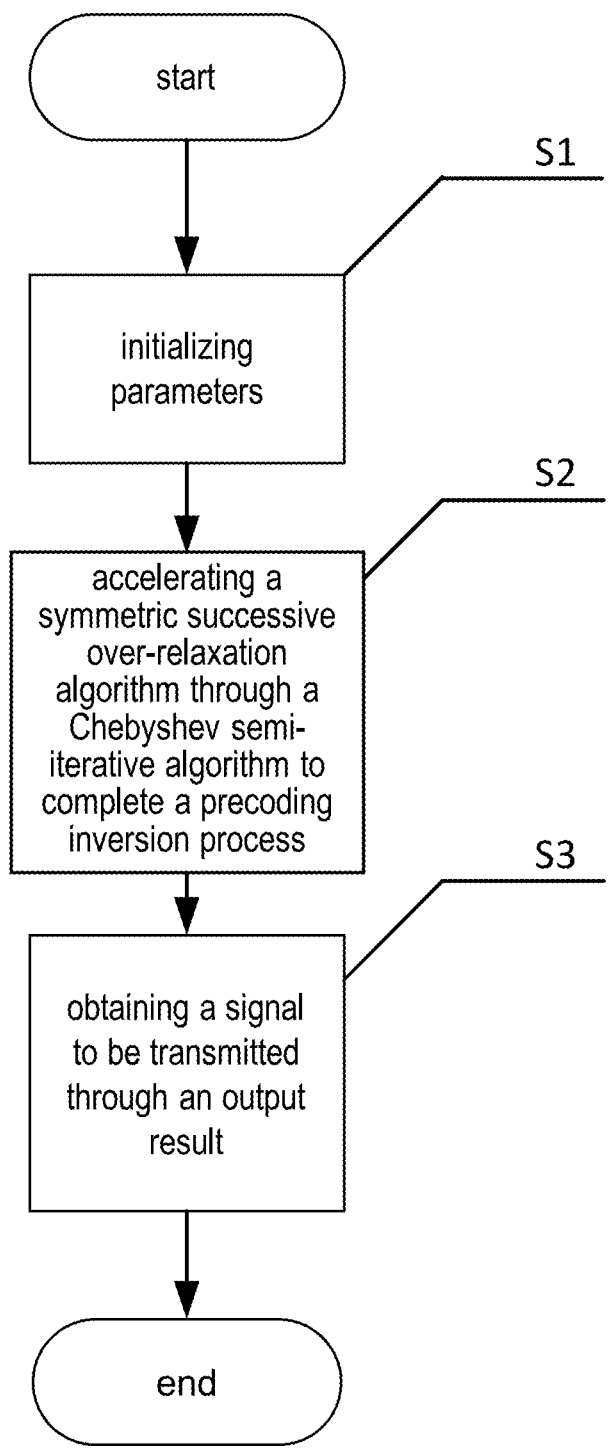
FIG. 1 is a flow chart of a low-complexity precoding method for large-scale MIMO fast convergence according to an embodiment of the disclosure.
Figure 2:
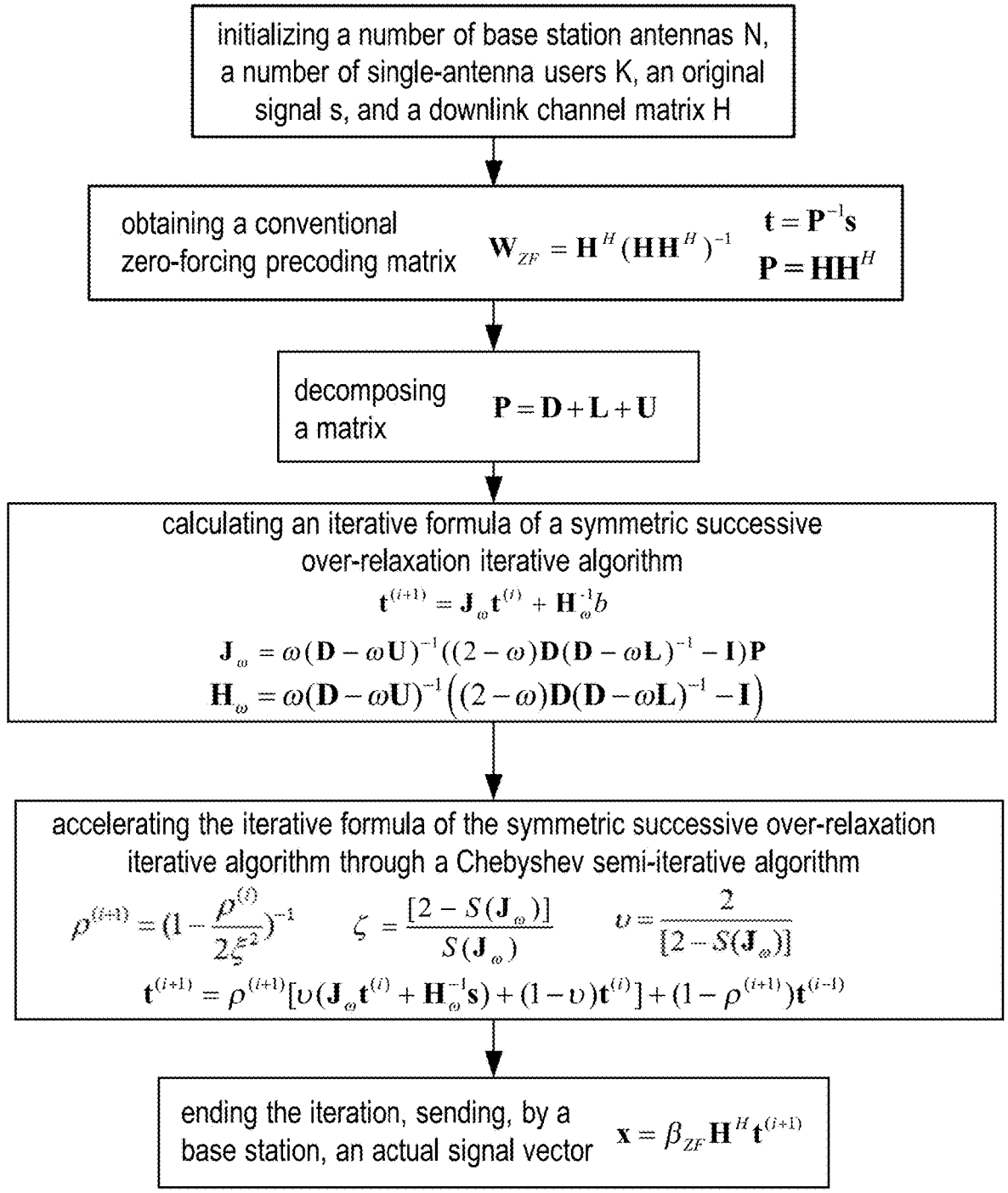
FIG. 2 is a flow chart of a symmetric successive over-relaxation algorithm of Chebyshev semi-iterative acceleration of the low-complexity precoding method for large-scale MIMO fast convergence according to an embodiment of the disclosure.
Figure 3:
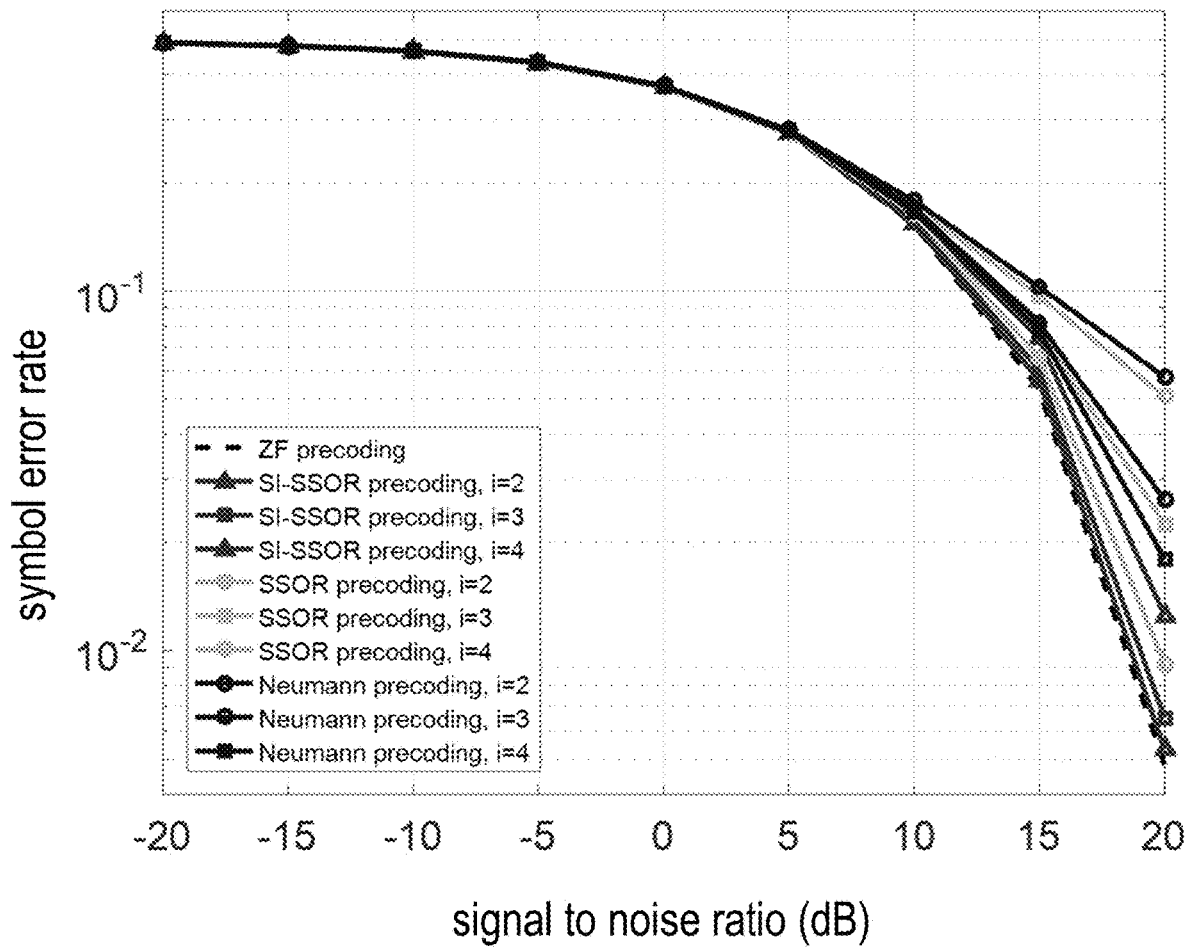
FIG. 3 is a graph comparing among symbol error rates of simulation results of a low-complexity precoding method, a Neumann series expansion method, and a symmetric successive over-relaxation iterative method according to an embodiment of the disclosure.
Figure 4:
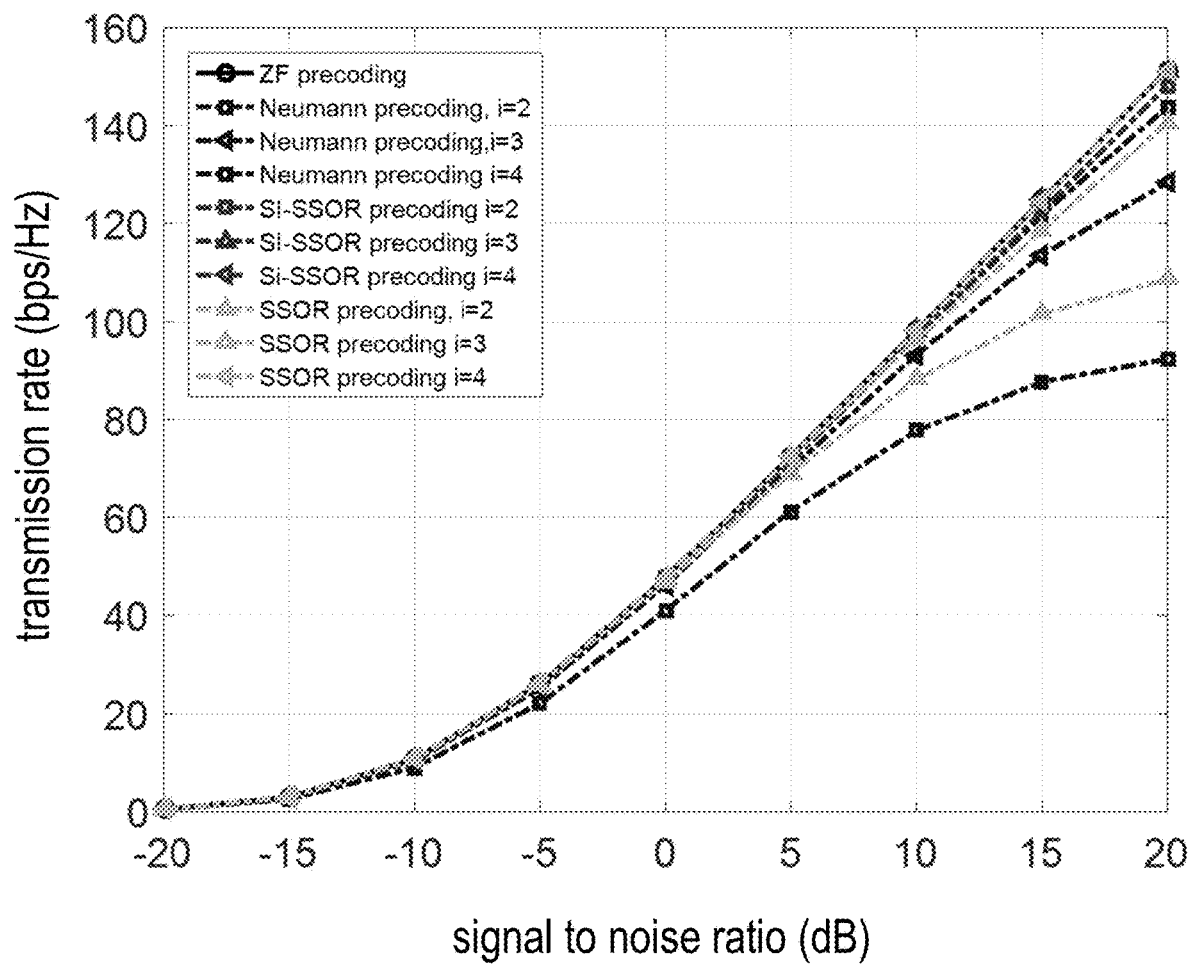
FIG. 4 is a graph comparing among transmission rates of the simulation results of the low-complexity precoding method, the Neumann series expansion method, and the symmetric successive over-relaxation iterative method according to an embodiment of the disclosure.

As shown in FIG. 1, the embodiments of the disclosure provide a low-complexity precoding method for large-scale MIMO fast convergence, and the method includes the following steps.

In S1, a precoding procedure is started to initialize relevant parameters of a MIMO transmitting antenna.

In S2, according to the initialized parameters, a symmetric successive over-relaxation algorithm is accelerated through a Chebyshev semi-iterative algorithm to complete a precoding inversion process.

In S3, a signal to be transmitted of the MIMO transmitting antenna is generated according to a result of the iterative algorithm, the precoding procedure is ended.

After the precoding procedure is started, initialization of the parameters of the MIMO transmitting antenna in step S1, including setting a number of transmitting antennas N, a number of single-antenna users K, and a channel transmission matrix H, may be performed.

After the parameters are set, the symmetric successive over-relaxation algorithm may begin to be accelerated through the Chebyshev semi-iterative algorithm to complete the precoding inversion process in S2. First, through the channel matrix H, a conventional zero-forcing precoding matrix $W_{ZF}$ is obtained. Since the $W_{ZF}$ contains matrix inversion computation, the symmetric successive over-relaxation iteration method is used to approximate the inversion computation of the matrix. Specific steps are provided as follows.

In S2.1, the conventional zero-forcing precoding matrix $W_{ZF}=H^H(HH^H)^{-1}$ is obtained, and the signal to be transmitted is:

$$x=\beta_{ZF}H^Ht$$

where $t=P^{-1}s$ and $P=HH^H$, $\beta_{ZF}$ is normalized transmission power, H is the channel transmission matrix, and the inversion process of the matrix is completed through symmetric successive over-relaxation.

In S2.2, a matrix P is decomposed, $P=D+L+U$, and D, L, and U respectively represent a diagonal element, a strictly lower triangular element, and a strictly upper triangular element.

In S2.3, t is solved through the symmetric successive over-relaxation iterative algorithm:

$$t^{(i+1)} = J_\omega t^{(i)} + H_\omega^{-1} b$$

$$J_\omega = \omega(D - \omega U)^{-1}((2-\omega)D(D-\omega L)^{-1} - I)P$$

$$H_\omega = \omega(D - \omega U)^{-1}((2-\omega)D(D-\omega L)^{-1} - I)$$

$$\omega = \frac{2}{1 + \sqrt{2(2 - (1+\sqrt{K/N})^2)}}$$

where N is the number of transmitting antennas, K is the number of single-antenna users, I is an identity matrix, and ω is an optimal relaxation parameter.

In S2.4, the symmetric successive over-relaxation algorithm is accelerated through the Chebyshev semi-iterative algorithm:

$$\rho^{(i+1)} = \left(1 - \frac{\rho^{(i)}}{2\xi^2}\right)^{-1}$$

$$\zeta = \frac{[2 - S(J_\omega)]}{S(J_\omega)}$$

$$\upsilon = \frac{2}{[2 - S(J_\omega)]}$$

$$t^{(i+1)} = \rho^{(i+1)}[\upsilon(J_\omega t^{(i)} + H_\omega^{-1} s) + (1-\upsilon)t^{(i)}] + (1-\rho^{(i+1)})t^{(i-1)}$$

where $\rho$, $\zeta$, and $\upsilon$ are Chebyshev parameters, and $S(J_{(w)})$ is a spectral radius of $J_w$:

$$S(J_\omega) = \lambda_{max}^2(B) = ((1+\sqrt{K/N})^2 - 1)^2$$

where $\lambda_{max}(B) < 1$ and $B = D^{-1}(L+U)$.

It is determined whether a number of iterations is satisfied, and iterations are continuously performed if the number of iterations is satisfied, and $t^{(i+1)}$ is outputted.

According to the iterative output result $t^{(i+1)}$ in step 2.4, an actually transmitted signal $x = \beta_{ZF} H^H t^{(i+1)}$ of the MIMO transmitting antenna of a base station is calculated.

Since $HH^H$ is a Hermitian matrix, so $\lambda_{max}(B) < 1$, and the iteration process is convergent. Since the entire algorithm is convergent, the low-complexity Chebyshev semi-iterative method is used to accelerate an iteration speed of the symmetric successive over-relaxation algorithm. A fast convergence speed is provided through the Chebyshev semi-iterative method-accelerated symmetric successive over-relaxation algorithm (SI-SSOR). Experiments show that two SI-SSOR iterations may achieve the performance of 4 iterations of the SSOR algorithm.

The precoding of large-scale MIMO fast convergence is analyzed, and a symbol error rate analysis and a transmission rate analysis are included. The symbol error rate analysis compares among symbol error rates of four types of precoding of ZF, SSOR, Neumann, and SI-SSOR under different number of iterations. The transmission rate analysis compares among transmission rates of the four types of precoding of ZF, SSOR, Neumann, and SI-SSOR under different number of iterations. Through comparison with theoretical values, as shown in Table 1, under the same performance requirements, the method provided by the disclosure exhibits faster convergence and lower complexity. A low-complexity precoding method for large-scale MIMO fast convergence has a fast convergence rate, and through 2 iterations, the symbol error rate performance achieved by the method is better than the symbol error rate performance achieved by most of the conventional precoding methods through 3 or 4 iterations.

Table 1 is a comparison table comparing among complexity of simulation results of the low-complexity precoding method, the Neumann series expansion method, and the symmetric successive over-relaxation iterative method according to the disclosure.

| Number of Iterations | Neumann Precoding | SSOR Precoding | SI-SSOR Precoding |
|---|---|---|---|
| i = 2 | $3K^2 - K$ | $4K^2$ | $4K^2 + 2K$ |
| i = 3 | $K^3 + K$ | $6K^2$ | $6K^2 + 3K$ |
| i = 4 | $2K^3 + K^2$ | $8K^2$ | $8K^2 + 4K$ |
| i = 5 | $3K^3 - K^2$ | $10K^2$ | $10K^2 + 5K$ |

A person having ordinary skill in the art can make various modifications and variations to the disclosure. If these modifications and variations are within the scope of the claims of the disclosure and their equivalent techniques, these modifications and variations are also within the protection scope of the disclosure.

The content not described in detail in the specification is the related art known to a person having ordinary skill in the art.

What is claimed is:

1. A low-complexity precoding method for large-scale multiple input multiple output (MIMO) fast convergence, comprising:
   in step 1, starting a precoding procedure to initialize relevant parameters of an MIMO transmitting antenna;
   in step 2, accelerating a symmetric successive over-relaxation algorithm through a Chebyshev semi-iterative algorithm to complete a precoding inversion process according to initialized parameters, comprising:
   in step 2.1, obtaining a zero-forcing precoding matrix $W_{ZF} = H^H(HH^H)^{-1}$ through a channel matrix after the initialized parameters are set, and a signal to be transmitted is:

$$x = \beta_{ZF} H^H t$$

wherein $t = P^{-1}s$ and $P = HH^H$, $\beta^{ZF}$ is normalized transmission power, H is a channel transmission matrix, and an inversion process of the zero-forcing precoding matrix is completed through the symmetric successive over-relaxation algorithm;
   in step 2.2, decomposing the matrix P, $P = D + L + U$, and D, L, and U respectively represent a diagonal element, a strictly lower triangular element, and a strictly upper triangular element;
   in step 2.3, solving t through the symmetric successive over-relaxation algorithm, $$t^{(i+1)} = J_\omega t^{(i)} + H_\omega^{-1} b$$

$$H_\omega = \omega(D - \omega U)^{-1}((2-\omega)D(D - \omega L)^{-1} - I)$$

$$\omega = \frac{2}{1 + \sqrt{2(2 - (1 + \sqrt{K/N})^2)}}$$

wherein N is a number of transmitting antennas, K is a number of single-antenna users, I is an identity matrix, and $\omega$ is an optimal relaxation parameter; and
   in step 2.4, accelerating the symmetric successive over-relaxation algorithm through the Chebyshev semi-iterative algorithm:

$$\rho^{(i+1)} = \left(1 - \frac{\rho^{(i)}}{2\xi^2}\right)^{-1}$$

$$\zeta = \frac{[2 - S(J_\omega)]}{S(J_\omega)}$$

$$\upsilon = \frac{2}{[2 - S(J_\omega)]}$$

$$t^{(i+1)} = \rho^{(i+1)}[\upsilon(J_\omega t^{(i)} + H_\omega^{-1} s) + (1-\upsilon)t^{(i)}] + (1-\rho^{(i+1)})t^{(i-1)}$$

wherein $\rho$, $\zeta$, and $\upsilon$ are Chebyshev parameters, and $S(J_\omega)$ is a spectral radius of $J_w$;

$$S(J_\omega) = \lambda_{max}^2(B) = ((1+\sqrt{K/N})^2 - 1)^2$$

where $\lambda_{max}(B) < 1$ and $B = D^{-1}(L+U)$,
   determining whether a number of iterations is satisfied, continuously performing iterations if the number of iterations is satisfied, and outputting $t^{(i+1)}$; and in step 3, generating the signal to be transmitted of the MIMO transmitting antenna according to a result of the Chebyshev semi-iterative algorithm and ending the precoding procedure.

2. The low-complexity precoding method for large-scale MIMO fast convergence according to claim 1, wherein the step 1 specifically comprises the following step:

initializing the parameters of the MIMO transmitting antenna, after the precoding procedure is started, comprising setting a number of transmitting antennas N, a number of single-antenna users K, and a channel transmission matrix H.

3. The low-complexity precoding method for large-scale MIMO fast convergence according to claim 1, wherein the step 3 specifically comprises the following step:

calculating an actually transmitted signal $x=\beta^{ZF}H^H t^{(i+1)}$ of the MIMO transmitting antenna of a base station according to the iterative output result $t^{(i+1)}$ in step 2.4.

4. The low-complexity precoding method for large-scale MIMO fast convergence according to claim 1, the method further comprises a method for analyzing and verifying the precoding method for large-scale MIMO fast convergence, comprising performing a symbol error rate analysis and a transmission rate analysis, wherein the symbol error rate analysis compares among symbol error rates of four types of precoding of zero-forcing (ZF), symmetric successive over-relaxation (SSOR), Neumann, and semi-iterative symmetric successive over-relaxation (SI-SSOR) under different number of iterations, the transmission rate analysis compares among transmission rates of the four types of precoding of ZF, SSOR, Neumann, and SI-SSOR under different number of iterations, and the low-complexity precoding method for large-scale MIMO fast convergence is verified to exhibit faster convergence and lower complexity under a same performance requirement through comparison.

* * * * *